(12) United States Patent
Desclos (10) Patent No.: US 12,183,138 B2
(45) Date of Patent: Dec. 31, 2024

(54) SYSTEM AND METHOD FOR AUTHENTICATING IDENTITY OF A PERSON WEARING AN EARPIECE

(71) Applicant: Kyocera AVX Components Corporation, Fountain Inn, SC (US)

(72) Inventor: Laurent Desclos, San Diego, CA (US)

(73) Assignee: Kyocera AVX Components Corporation, Fountain Inn, SC (US)

( * ) Notice: Subject to any disclaimer, the term of this patent is extended or adjusted under 35 U.S.C. 154(b) by 2 days.

(21) Appl. No.: 17/853,043

(22) Filed: Jun. 29, 2022

(65) Prior Publication Data

US 2023/0005311 A1 Jan. 5, 2023

Related U.S. Application Data

(60) Provisional application No. 63/216,775, filed on Jun. 30, 2021.

(51) Int. Cl.
*H01Q 3/00* (2006.01)
*G06V 10/40* (2022.01)
(Continued)

(52) U.S. Cl.
CPC ......... *G07C 9/00563* (2013.01); *G06V 10/40* (2022.01); *G06V 10/764* (2022.01); *G06V 40/10* (2022.01)

(58) Field of Classification Search
CPC ........ G07C 9/00563; G07C 9/37; G07C 9/32; G06V 10/40; G06V 10/764; G06V 40/10; G06V 40/173; G06V 40/15; G06V 40/20; H04W 12/02; H04W 12/033; H04W 4/80; H04S 2400/01; H04S 2400/11; H04S 2400/13; H04S 2420/01; H04S 3/008; H04S 7/303; H04S 7/304; H04M 1/6066; H04M 1/72412; H04L 63/18; G16Z 99/00; G16H 20/30; G16H 20/40; G16H 40/63; G16H 40/67; G08B 7/06; G06T 7/00; G06F 21/31; G06F 21/32; G06F 21/35; G06F 2218/12; A61H 2201/0188; A61H 2201/02; A61H 2201/10; A61H 2201/1604; A61H 2201/165; A61H 2201/501; A61H 2201/5012; A61H 2201/5046;
(Continued)

(56) References Cited

U.S. PATENT DOCUMENTS

5,548,837 A * 8/1996 Hess .................. H04B 7/10
343/757
10,446,930 B1 * 10/2019 Gommé ............ H01Q 15/0053
(Continued)

*Primary Examiner* — Dionne Pendleton
(74) *Attorney, Agent, or Firm* — Dority & Manning, P.A.

(57) ABSTRACT

A person authentication system is provided. The person authentication system includes one or more image capture devices. The person authentication system includes a computing system. The computing system includes one or more computing devices. The computing system is configured to obtain data indicative of a unique identifier associated with an earpiece worn by a person. The computing system is configured to obtain image data of an ear of the person via the one or more image capture devices. The computing system is configured to authenticate an identity of the person based, at least in part, on the image data and the data indicative of the unique identifier.

19 Claims, 8 Drawing Sheets

(51) Int. Cl.
*G06V 10/764* (2022.01)
*G06V 40/10* (2022.01)
*G07C 9/00* (2020.01)

(58) Field of Classification Search
CPC .... A61H 2201/5058; A61H 2201/5061; A61H 2201/5064; A61H 2201/5082; A61H 2201/5092; A61H 2201/5097; A61H 2205/027; A61H 2230/00; A61H 2230/045; A61H 2230/065; A61H 2230/105; A61H 2230/305; A61H 2230/405; A61H 2230/605; A61H 2230/655; A61H 23/02; A61H 23/0236; A61H 23/0245; A61F 7/007; A61B 2017/00044; A61B 5/00; A61B 5/0077; A61B 5/053; A61B 5/12; A61B 5/24; A61B 5/30; A61B 5/318; A61B 5/4005; A61B 5/4094; A61B 5/4806; A61B 5/6816; A61B 5/6898; H04R 1/1016; H04R 2225/55; H04R 25/505; H04R 25/70; H04R 5/033; H04R 1/1041; H04R 1/403; H04R 2225/41; H04R 2225/61; H04R 2225/81; H04R 2460/07; H04R 2460/13; H04R 2499/11; H04R 2499/13; H04R 2499/15; H04R 25/305; H04R 25/552; H04R 25/554; H04R 25/556; H04R 25/558; H04R 25/603; H04R 25/606; H04R 29/002; H04R 3/12; A63F 13/424; A63F 13/212; A61N 1/0456; A61N 1/0472; A61N 1/36021; A61N 1/36025; A61N 1/36036; A61N 1/37247; A61N 2/002; A61N 2/006; A61N 2/02; A61N 5/0622; A61N 7/00; A61N 1/0484; A61N 1/36014; A61N 1/36031; A61N 2005/0605; A61N 2005/0647; A61N 2007/0026

See application file for complete search history.

(56) References Cited

U.S. PATENT DOCUMENTS

| | | | |
|---|---|---|---|
| 2011/0309980 A1* | 12/2011 | Ali | H01Q 1/245 342/368 |
| 2015/0172827 A1* | 6/2015 | Sharpe | H04R 25/305 381/312 |
| 2017/0113057 A1* | 4/2017 | Goodall | A61N 1/36031 |
| 2020/0137509 A1* | 4/2020 | Stanek | H04S 7/304 |
| 2021/0281957 A1* | 9/2021 | Goekay | H04R 25/70 |
| 2021/0298675 A1 | 9/2021 | Kellett, Jr. | |

* cited by examiner

SYSTEM AND METHOD FOR AUTHENTICATING IDENTITY OF A PERSON WEARING AN EARPIECE

PRIORITY CLAIM

This application claims the benefit of priority of U.S. Provisional Patent Application Ser. No. 63/216,775, filed on Jun. 30, 2021, titled "System and Method for Authenticating Identity of a Person Wearing an Earpiece," which is incorporated herein by reference.

FIELD

The present disclosure relates generally to earpieces and, more particularly, to a system and method for authenticating the identity of a person wearing an earpiece.

BACKGROUND

Earpieces are wearable devices that can be inserted into an ear of a person. Earpieces can include one or more electronic components (e.g., transducers) associated with converting an electrical signal into an audio signal. For example, the audio signal can be associated with an incoming call to a mobile computing device (e.g., smartphone, tablet) associated with the person. In this manner, the person can listen to the audio signal in private.

SUMMARY

Aspects and advantages of embodiments of the present disclosure will be set forth in part in the following description, or may be learned from the description, or may be learned through practice of the embodiments.

In one aspect, a method of authenticating a person is provided. The method includes obtaining data indicative of a unique identifier associated with an earpiece worn by a person. The method includes obtaining image data of an ear of the person. The method includes authenticating an identity of the person based, at least in part, on the image data and the data indicative of the unique identifier.

In another aspect, a person authentication system is provided. The person authentication system includes one or more image capture devices. The person authentication system includes a computing system. The computing system includes one or more computing devices. The computing system is configured to obtain data indicative of a unique identifier associated with an earpiece worn by a person. The computing system is configured to obtain image data of an ear of the person via the one or more image capture devices. The computing system is configured to authenticate an identity of the person based, at least in part, on the image data and the data indicative of the unique identifier.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to authentication systems. In some examples, an earpiece issued to a person can be configured to broadcast or otherwise communicate data indicative of a unique identifier associated with the earpiece. The unique identifier can be used to determine an identity (e.g., name) of the person that was issued the earpiece. However, instances can occur in which the person wearing the earpiece is not the person that was issued the earpiece. In such instances, the identity of the person wearing the earpiece cannot be determined based on the unique identifier.

Example aspects of the present disclosure are directed to a person authentication system. The person authentication system can include a computing system configured to obtain the data indicative of the unique identifier associated with an earpiece worn by a person. For instance, the computing system can be communicatively coupled to the earpiece over a network. In this manner, the earpiece can, for instance, communicate the data indicative of the unique identifier to the computing system via the network.

The computing system can be configured to obtain image data indicative of an ear of the person. For instance, the image data can be obtained from one or more image capture devices (e.g., cameras) positioned at an entrance to a restricted area the person wearing the earpiece is attempting to enter. In some implementations, the image data can include one or more images of an outer ear of the person. For instance, the one or more images of the outer ear can depict one or more anatomical features (e.g., helix) of the periphery of the ear that are specific to the person wearing the earpiece. Alternatively, or additionally, the image data can include one or more images of an inner ear. It should be appreciated that the inner ear can include one or more anatomical features (e.g., antihelix, triangular fossa) of the ear that are positioned closer to an entrance to a canal of the ear than the outer ear.

The computing system can be configured to authenticate the identity of the person wearing the earpiece based, at least in part, on the unique identifier associated with the earpiece and the image data. For instance, the computing system can be configured to determine the identity of person to whom the earpiece was issued based, at least in part, on the unique identifier associated with the earpiece. Additionally, the computing system can be configured to determine whether the person wearing the earpiece is the same person to whom the earpiece was issued based, at least in part, on the image data.

In some implementations, the computing system can compare the one or more images of the ear of the person wearing the earpiece to one or more images of the ear of the person issued the earpiece. For instance, the computing system can determine whether one or more anatomical features of the ear of the person wearing the earpiece correspond (e.g., match) one or more anatomical features of the ear of the person issued the earpiece. In some implementations, the computing system can compare one or more anatomical features of the outer ear of the person to whom the earpiece was issued to one or more anatomical features of the outer ear of the person wearing the earpiece. Alternatively, or additionally, the computing system can compare one or more anatomical features of the inner ear of the person to whom the earpiece was issued to one or more anatomical features of the inner ear of the person wearing the earpiece.

In alternative implementations, the computing system can classify the image data of the ear of the person wearing the earpiece using one or more machine-learned image classifier models to determine an image classification for the image data. Furthermore, the computing system can be configured to authenticate the identity of the person wearing the earpiece based, at least in part, on the image classification. The person authentication system according to example aspects of the present disclosure can provide numerous technical benefits and advantages. For instance, since the person authentication system authenticates the identity of the person wearing the earpiece based on both the unique identifier (e.g., MAC address) associated with the earpiece and the image data of the ear of the person wearing the earpiece, the person authentication system can more accurately authenticate the identity of the person. Furthermore, since the image data can include one or more images of the outer ear and the inner ear (that is, portions of the ear that are closer to an entrance the ear canal than the outer ear), the person authentication system can authenticate the identity of the person based on one or more anatomical features associated with the outer ear and one or more anatomical features associated with the inner ear. In this manner, person authentication systems according to example aspects of the present disclosure can provide three-factor (e.g., unique identifier, outer ear, inner ear) authentication of the identity of the person wearing the earpiece.

Figure 1:
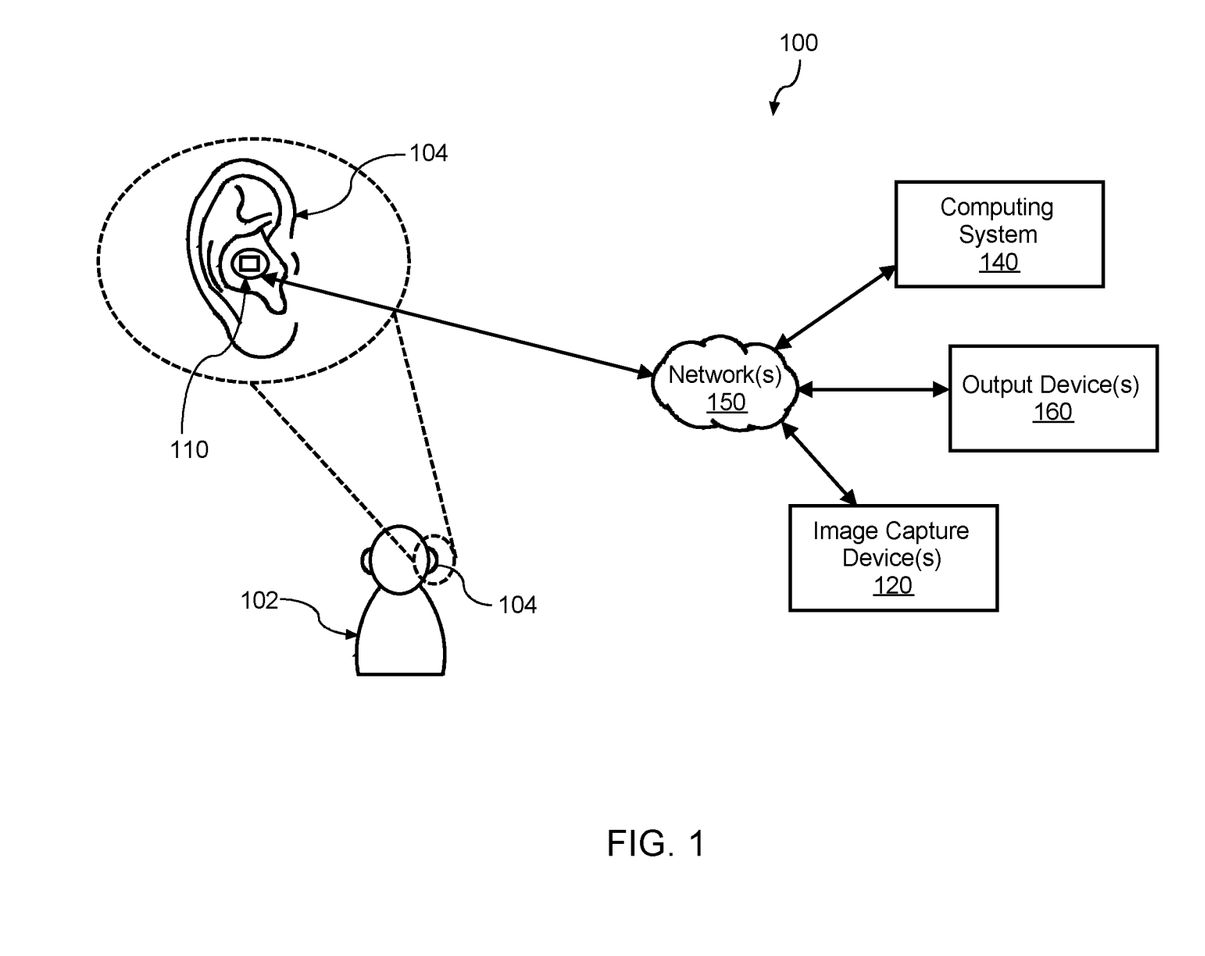
FIG. 1 depicts a block diagram of a person authentication system.

Referring now to the FIGS, FIG. 1 depicts a person authentication system 100 for a person 102 wearing an earpiece 110 according to an example embodiment of the present disclosure. In some implementations, the earpiece 110 can be an over-the-ear earpiece. In alternative implementations, the earpiece 110 can be an in-ear earpiece. It should be understood, however, that the earpiece 110 can include any suitable earpiece.

The earpiece 110 can be configured to transmit data indicative of a unique identifier (e.g., MAC address) for the earpiece 110. For instance, the earpiece 110 can be configured to transmit a beacon signal that includes data indicative of the unique identifier for the earpiece 110. It should be appreciated that the unique identifier can be indicative of the identity (e.g., name) of the person to whom the earpiece 110 was issued. In some instances, the person to whom the earpiece 110 was issued can be the person 102 wearing the earpiece 110. Alternatively, the person 102 wearing the earpiece 110 can be different than the person to whom the earpiece 110 was issued. The person authentication system 100 can include one or more image capture devices 120. The one or more image capture devices 120 can obtain image data of the ear 104 of the person 102 wearing the earpiece 110. For instance, the image data of the ear 104 of the person 102 wearing the earpiece 110 can include one or more images of an outer ear of the person 102.

In some implementations, the one or more image capture devices 120 can be positioned at an entrance (e.g., door) to a restricted area. In this manner, the one or more image capture devices 120 can obtain image data of the ear 104 of the person 102 prior to the person 102 entering the restricted area. As will be discussed below in more detail, the person authentication system 100 can authenticate the identity of the person 102 based, at least in part, on unique identifier (e.g., medium access control (MAC) address) obtained from the earpiece 110 and the image data obtained from the one or more image capture devices 120.

As shown, the person authentication system 100 can include a computing system 140. The computing system 140 can be communicatively coupled to the earpiece 110. In this manner, the computing system 140 can obtain the data indicative of the unique identifier associated with the earpiece 110. Furthermore, the computing system 140 can be communicatively coupled to the one or more image capture devices 120. In this manner, the computing system 140 can obtain the image data of the ear 104 of the person 102.

In some implementations, the computing system 140 can be communicatively coupled to the earpiece 110 and the one or more image capture devices 120 via one or more wireless networks 150. In some implementations, the one or more wireless networks 150 can include a cellular network. Alternatively, or additionally, the one or more wireless networks 150 can include a wireless local area network (WLAN), such as a 802.11 network (e.g., WiFi network). It should also be understood that the one or more wireless networks 150 can have any suitable topology. For instance, in some implementations, the one or more wireless networks 150 can be a mesh network. In such implementations, the earpiece 110 can communicate with other earpieces on the mesh network.

The computing system 140 can be configured to determine the identity of the person to whom the earpiece 110 was issued based, at least in part, on the data indicative of the unique identifier associated with the earpiece 110. For instance, the computing system 140 can obtain the beacon signal from the earpiece 110 via the one or more wireless network 150. As discussed above, the beacon signal can include the data indicative of the unique identifier. In some implementations, the computing system 140 can be configured to access a database configured to store data (e.g., table, list, etc.) that associates the unique identifier associated with the earpiece 110 to a person to whom the earpiece 110 was issued. For instance, in some implementations, the data stored in the database can include the name of the person to whom the earpiece 110 was assigned. In this manner, the computing system 140 can access the data stored in the database to determine the identity (e.g., name) of the person to whom the earpiece 110 was issued.

The computing system 140 can be configured to obtain the image data from the one or more image capture devices 120. For instance, the computing system 140 can obtain the image data from the one or more image capture devices 120 via the one or more wireless network 150. In some implementations, the computing system 140 can be configured to classify the image data of the ear 104 of the person 102 to determine an image classification. For instance, the image data can be provided as an input to one or more machine-learned image classifier models of the computing system 140. The one or more machine-learned image classifier models can be configured to process the image data to output the image classification.

Furthermore, in such implementations, the computing system 140 can be configured to authenticate the identity (e.g., name) of the person 102 wearing the earpiece 110 based, at least in part, on the image classification output by the one or more machine-learned image classifier models.

In some implementations, the computing system 140 can compare the one or more images of the ear 104 of the person 102 wearing the earpiece 110 to one or more images of the ear of the person to whom the earpiece 110 was issued. For instance, the computing system 140 can compare anatomical features of the ear 104 of the person 102 wearing the earpiece 110 to one or more anatomical features of the person to whom the earpiece 110 was issued. When one or more anatomical features of the ear 104 of the person 102 wearing the earpiece 110 differ from one or more anatomical feature of the ear of the person issued the earpiece 110, the computing system 140 can determine the person 102 wearing the earpiece 110 is not the person to whom the earpiece 110 was issued. Alternatively, the computing system 140 can determine the person 102 wearing the earpiece 110 is the person to whom the earpiece 110 was issued when the one or more anatomical features of the ear of the person 102 wearing the earpiece 110 correspond to the one or more anatomical features of the ear of the person to whom the earpiece 110 was issued. In some implementations, the one or more anatomical features can be associated with the outer ear (e.g., scaphoid fossa, helix, anti-helix, anti-tragus). For instance, one or more anatomical features of the outer ear of the person 102 wearing the earpiece 110 can be compared to the one or more anatomical features of the outer ear of the person to whom the earpiece 110 was issued.

In some implementations, the computing system 140 can be configured to provide a notification indicative of whether the identity of the person 102 wearing the earpiece 110 has been authenticated. For instance, the notification can be displayed via one or more output devices 160 (e.g., display screen, speaker, etc.) of the person authentication system 100. It should be appreciated that the notification can include at least one of an audible or visual alert. In some implementations, the one or more output devices 160 can be positioned at the entrance to the restricted area. In this manner, personnel posted at the entrance to the restricted area can determine whether to permit the person 102 wearing the earpiece 110 to enter the restricted area based, at least in part, on the notification.

Figure 2:
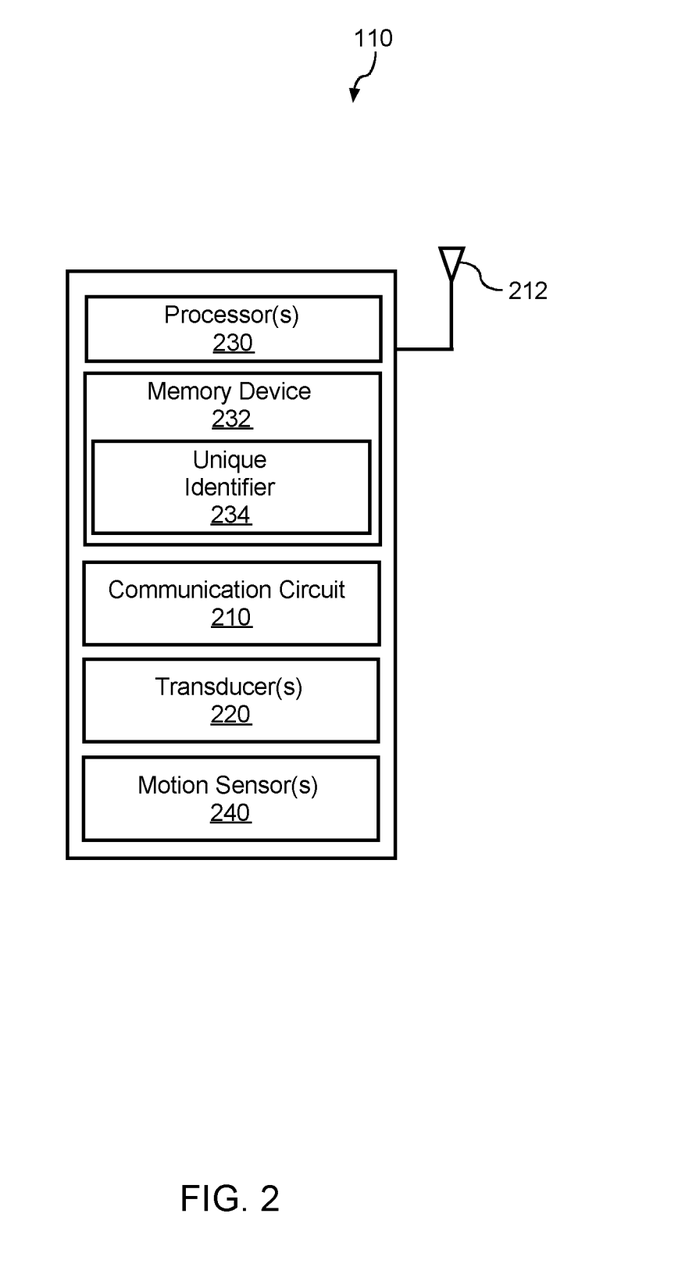
FIG. 2 depicts a block diagram of components of an earpiece according to example embodiments of the present disclosure.

Referring now to FIG. 2, components of the earpiece 110 are provided according to example embodiments of the present disclosure. As shown, the earpiece 110 can include a communication circuit 210 and an antenna 212. In this manner the earpiece 110 can transmit and receive data. In some implementations, the communication circuit 210 can include a near-field communication circuit. The antenna 212 can, in some implementations, include an antenna having a fixed radiation pattern.

In alternative implementations, the antenna can include a modal antenna configurable in a plurality of antenna modes. Furthermore, each of the plurality of antenna modes can have a distinct radiation pattern, polarization, or both. In some implementations, the modal antenna can be configured in different antenna modes based, at least in part, on a link quality (e.g., channel quality indicator) between the earpiece and a receiver (e.g., another earpiece, access point, base station). For instance, the modal antenna can be configured in different antenna modes as the person 102 (FIG. 1) navigates an area to steer the radiation pattern towards the receiver (e.g., other earpieces, access points, base stations) in the area. In this manner, a link quality (e.g., channel quality indicator) between the modal antenna and the receiver (e.g., other earpieces, access points, base stations, etc.) can be improved.

The earpiece 110 can further include one or more transducers 220. The one or more transducers 220 can be configured to convert an electrical signal to an audio signal. For instance, the electrical signal can be received via the antenna 212 and can be provided as an input to the one or more transducers 220. The one or more transducers 220 can convert the electrical signal to output the audio signal. In this manner, audible noise associated with the audio signal can be provided to the ear 104 (FIG. 1) of the person 102 (FIG. 1).

The earpiece 110 can include one or more processors 230 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

The earpiece 110 can include a memory device 232. Examples of the memory device 232 can include computer-readable media including, but not limited to, non-transitory computer-readable media, such as RAM, ROM, hard drives, flash drives, or other suitable memory devices. The memory device 232 can store information accessible by the one or more processors 230 including the unique identifier 234 associated with the earpiece 110. The one or more processors 230 can access the memory device 232 to obtain the unique identifier 234. For instance, in some implementations, the one or more processors 230 can be configured to generate a beacon signal that includes the unique identifier 234. Furthermore, the one or more processors 230 can be further configured to transmit the beacon signal via the antenna 212.

In some implementations, the earpiece 110 can include one or more inertial sensors 240 configured to obtain data indicative of motion of the earpiece 110. For instance, in some implementations, the one or more inertial sensors 240 can include an accelerometer. The accelerometer can be configured to obtain data indicative of acceleration of the earpiece 110 along one or more axes. Alternatively, or additionally, the one or more inertial sensors 240 can include a gyroscope. The gyroscope can be configured to obtain data indicative of orientation of the earpiece 110. Additionally, the gyroscope can be configured to obtain data indicative of angular velocity of the earpiece 110.

Figure 3:
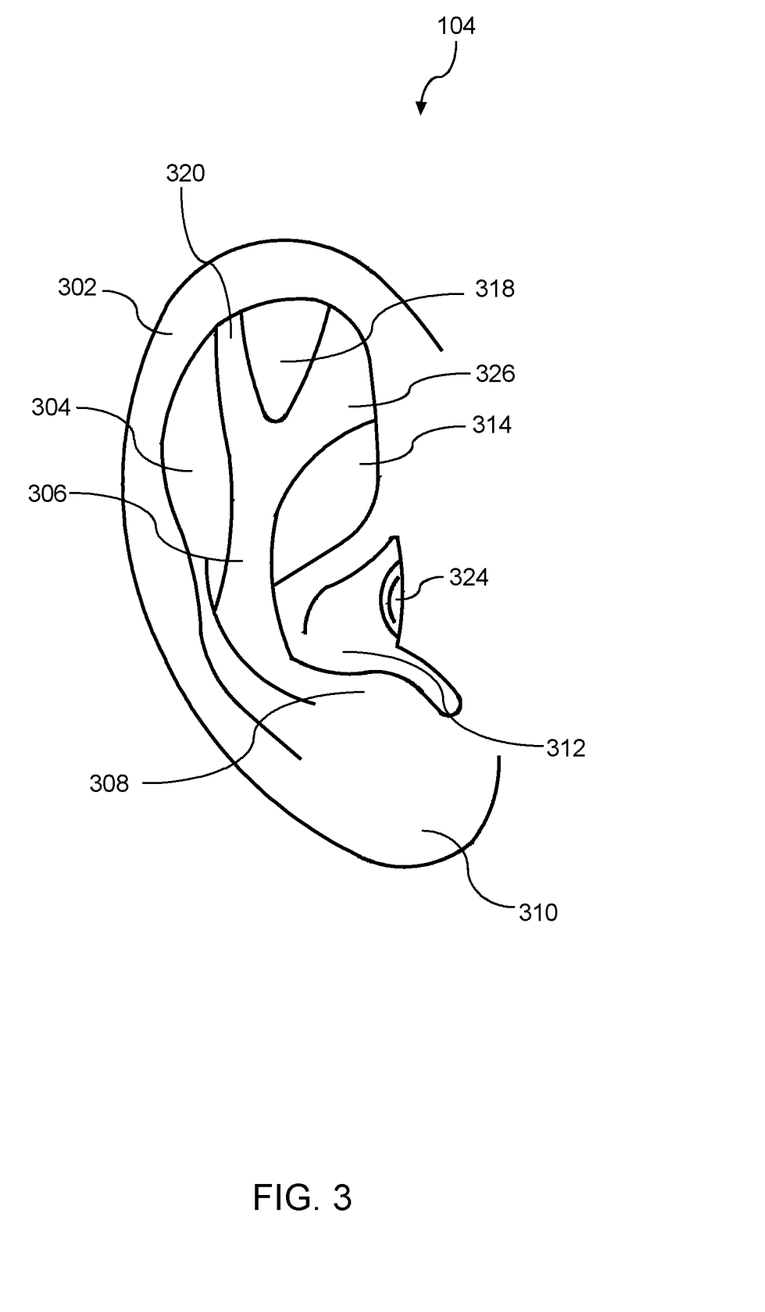
FIG. 3 depicts an image of an ear of a person according to example embodiments of the present disclosure.

Referring now to FIG. 3, an image of the ear 104 without the earpiece 110 (FIG. 1) is provided according to example embodiments of the present disclosure. As shown, the image is of the ear 104 of the person 102 (FIG. 1). The image of the ear 104 depicts an outer ear and an inner ear. The outer ear includes a portion of a periphery of the ear 104. For instance, the outer ear can include a helix 302 of the ear 104. Conversely, the inner ear can include one or more portions of the ear 104 that are closer to an entrance of a canal of the ear 104 than the outer ear (e.g., helix 302). For instance, the inner ear can include, a scaphoid fossa 304 of the ear 104, an antihelix 306 of the ear 104, an antitragus 308 of the ear 104, a lobule 310 of the ear 104, a concha cavum 312 of the ear 104, a concha cymba 314 of the ear 104, an inferior crus 316 of the ear 104, a triangular fossa 318 of the ear 104, and a superior crus 320 of the ear 104.

Figure 4:
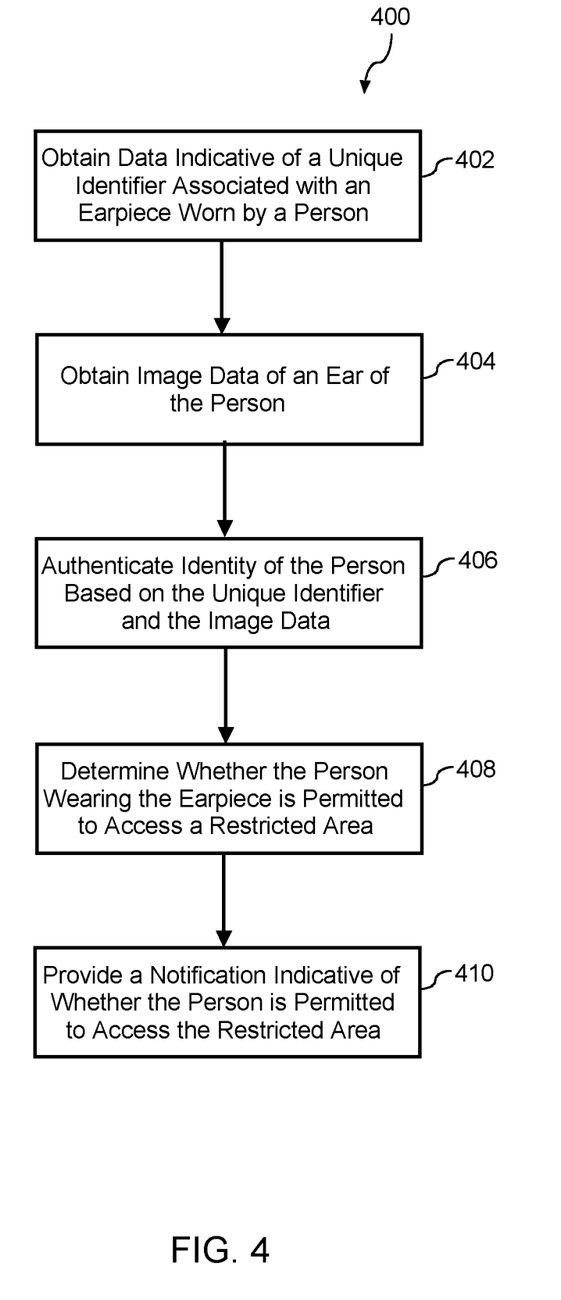
FIG. 4 depicts a flow diagram of a method for authenticating identity of a person wearing an earpiece according to example embodiments of the present disclosure.

Referring now to FIG. 4, a flow diagram of a method 400 of authenticating a person is provided according to example embodiments of the present disclosure. In general, the method 400 will be discussed herein with reference to the person authentication system 100 described above with reference to FIG. 1. In addition, although FIG. 4 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 can include obtaining, by a computing system having one or more computing devices, data indicative of a unique identifier associated with an earpiece worn by a person. In some implementations, the data indicative of the unique identifier can be included in one or more signals (e.g., beacon signal) transmitted by the earpiece. Furthermore, in some implementations, the one or more signals can be transmitted to the computing system via a network. Still further, in some implementations, the one or more signals can be transmitted to the computing system via the network when the person is within a predetermined proximity (e.g., about 15 feet) of an entrance to a restricted area.

At (404), the method 400 can include obtaining, by the computing system, image data of an ear of the person. For instance, obtaining image data can include obtaining one or more images of the ear. In some implementations, the one or more images can include an image of the outer ear of the person. As will be discussed below, identity of the person wearing the earpiece can be authenticated based, at least in part, on one or more anatomical features associated with the outer ear of the person.

At (406), the method 400 can include authenticating, by the computing system, an identity of the person wearing the earpiece based, at least in part, on unique identifier obtained at (402) and the image data obtained at (404). For instance, authenticating the identity of the person wearing the earpiece can include determining, by the computing system, whether the person wearing the earpiece is the person to whom the earpiece was issued. Furthermore, in some implementations, authenticating the identity of the person can include authenticating the identity of the person based, at least in part on, one or more anatomical features of the outer ear and one or more anatomical features of the inner ear.

At (408), the method 400 can include determining, by the computing system, whether the person wearing the earpiece is permitted to access the restricted area the person is attempting to enter. For instance, determining whether the person wearing the earpiece is permitted to access the restricted area can include, for instance, accessing, by the computing system, a database storing data that is indicative of persons permitted to access the restricted area. In some implementations, the data stored in the database can include a list of persons that are permitted to access the restricted area. It should be understood, however, that the data can be stored in the database in any suitable format.

At (410), the method 400 can include providing, by the computing system, a notification indicative of whether the person wearing the earpiece is permitted to access the restricted area. For instance, in some implementations, providing the notification can include providing, by the computing system, the notification for display on the one or more output devices located at an entrance to the restricted area. It should be understood that the notification can include at least one of an audible alert or a visual alert.

Figure 5:
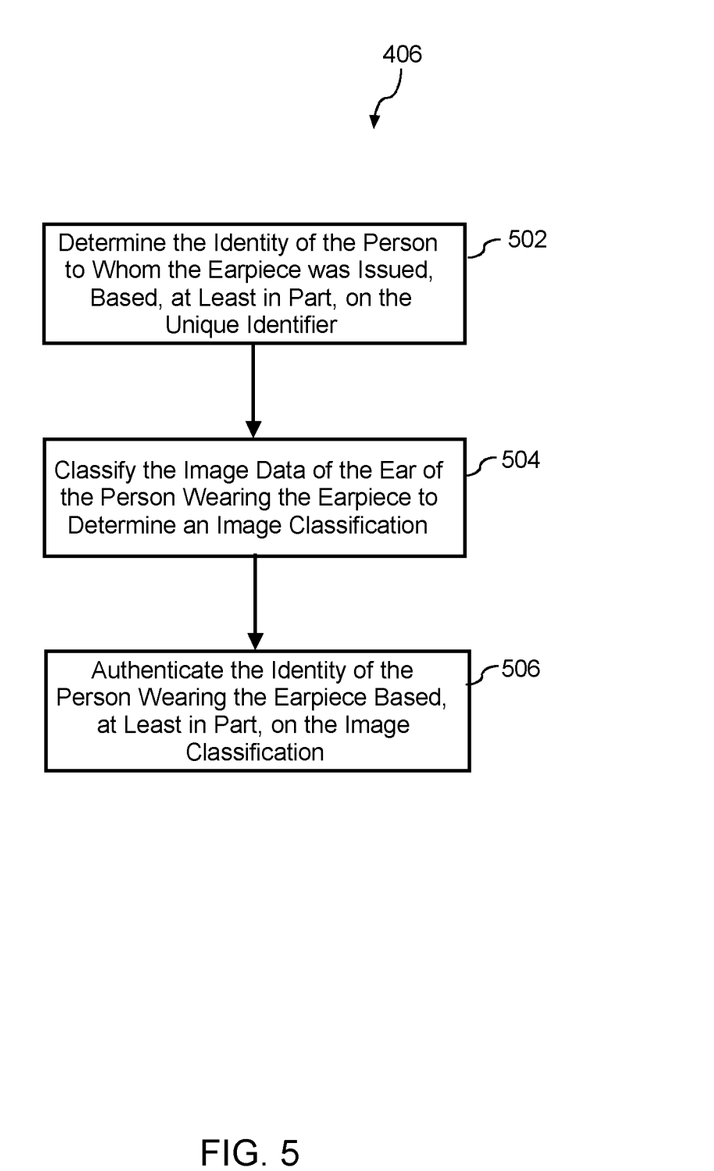
FIG. 5 depicts a flow diagram of a method of authenticating identity of a person wearing an earpiece according to example embodiments of the present disclosure.

Referring now to FIG. 5, a flow diagram of a process for authenticating the identity of the person wearing the earpiece the person at (406) of the method 400 discussed above with reference to FIG. 4 is provided according to an example embodiment of the present disclosure. As shown, authenticating the identity of the person wearing the earpiece can include, at (502) determining the identity of the person to whom the earpiece was issued based, at least in part, on the data indicative of the unique identifier obtained at (402) of the method 400 discussed with reference to FIG. 4. In some implementations, determining the identity of the person to whom the earpiece was issue can include determining, by the computing system, one of the plurality of persons as the person associated with the earpiece can include accessing, by the computing system, a database storing data that associates each of the plurality of persons to a different earpiece based, at least in part, on the unique identifier associated with each earpiece. In this, manner, the computing system can match the unique identifier associated with the earpiece worn by the person to one of the plurality of persons to determine the identity (e.g., name) of the person to whom the earpiece was issued.

The process for authenticating the identity of the person wearing the earpiece at (406 of the method 400 discussed above with reference to FIG. 4 can include, at (504), classifying, by the computing system, the image data obtained at (404) of the method 400 of FIG. 4 to determine an image classification. For instance, classifying the image data to determine an image classification can include providing, by the computing system, the image data as an input to one or more machine-learned image classifier models. The one or more machine-learned image classifier models can process the image data to provide the image classification of the image data as an output of the one or more machine-learned image classifier models.

In some implementations, the one or more machine-learned image classifier models can be configured to determine the image classification for the image data based, at least in part, on one or more anatomical features of the ear of the person wearing the earpiece. For instance, the one or more machine-learned image classifier models can be configured to determine the image classification based, at least in part, on one or more anatomical features of the outer ear of the person wearing the earpiece. It should be appreciated that the one or more anatomical features can include, for instance, the size and/or shape of various portions of the outer ear of the person wearing the earpiece.

The process for authenticating the identity of the person wearing the earpiece at (406 of the method 400 discussed above with reference to FIG. 4 can include, at (506), authenticating, by the computing system, the identity of the person wearing the earpiece based, at least in part, on the image classification determined at (504). For instance, in some implementations, authenticating the identity of the person wearing the earpiece based, at least in part, on the image classification can include determining, by the computing system, the person wearing the earpiece is not the person to whom the earpiece was issued. In alternative implementations, authenticating the identity of the person wearing the earpiece based, at least in part, on the image classification can include determining, by the computing system, the person wearing the earpiece is the person to whom the earpiece was issued.

Figure 6:
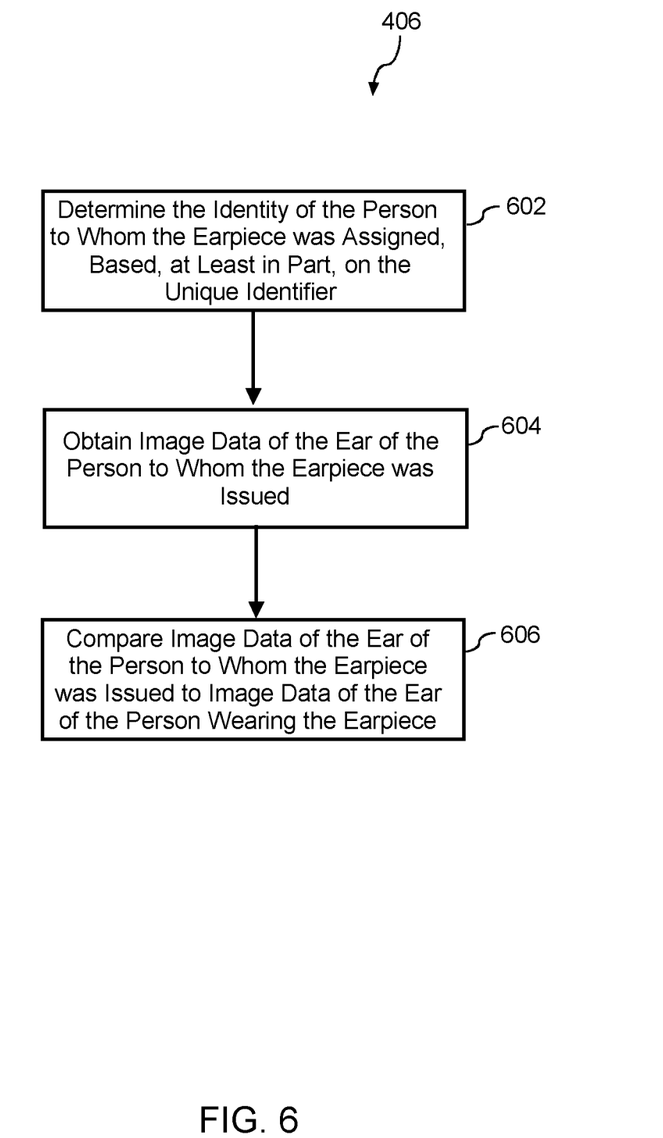
FIG. 6 depicts a flow diagram of a method of authenticating identity of a person wearing an earpiece according to example embodiments of the present disclosure.

Referring now to FIG. 6, a flow diagram of a process for authenticating the identity of the person wearing the earpiece the person at (406) of the method 400 discussed above with reference to FIG. 4 is provided according to an example embodiment of the present disclosure. As shown, authenticating the identity of the person wearing the earpiece can include, at (602) determining the identity of the person to whom the earpiece was issued based, at least in part, on the data indicative of the unique identifier obtained at (402) of the method 400 discussed with reference to FIG. 4.

The process for authenticating the identity of the person wearing the earpiece at (406 of the method 400 discussed above with reference to FIG. 4 can include, at (604), obtaining image data of the ear of the person to whom the earpiece was issued. For instance, obtaining image data of the ear of the person to whom the earpiece was issued can include accessing, by the computing system, a database configured to store image data of the ear of each of a plurality persons to whom an earpiece was issued.

At (606), the process of authenticating the identity of the person wearing the earpiece can include comparing, by the computing system, the image data of the ear of the person wearing the earpiece and the image data of the ear of the person to whom the earpiece was issued. The computing system can be configured to determine whether one or more anatomical features of the ear of the person wearing the earpiece correspond to one or more anatomical features of the ear of the person to whom the earpiece was issued.

In some implementations, the computing system can be configured to determine whether one or more anatomical features of the outer ear of the person wearing the earpiece correspond to one or more anatomical features of the outer ear of the person to whom the earpiece was assigned. For example, the computing system can be configured to determine whether a portion (e.g., helix, antihelix, triangular fossa etc.) of the outer ear of the person wearing the earpiece matches the corresponding portion of the outer ear of the person to whom the earpiece was issued.

Figure 7:
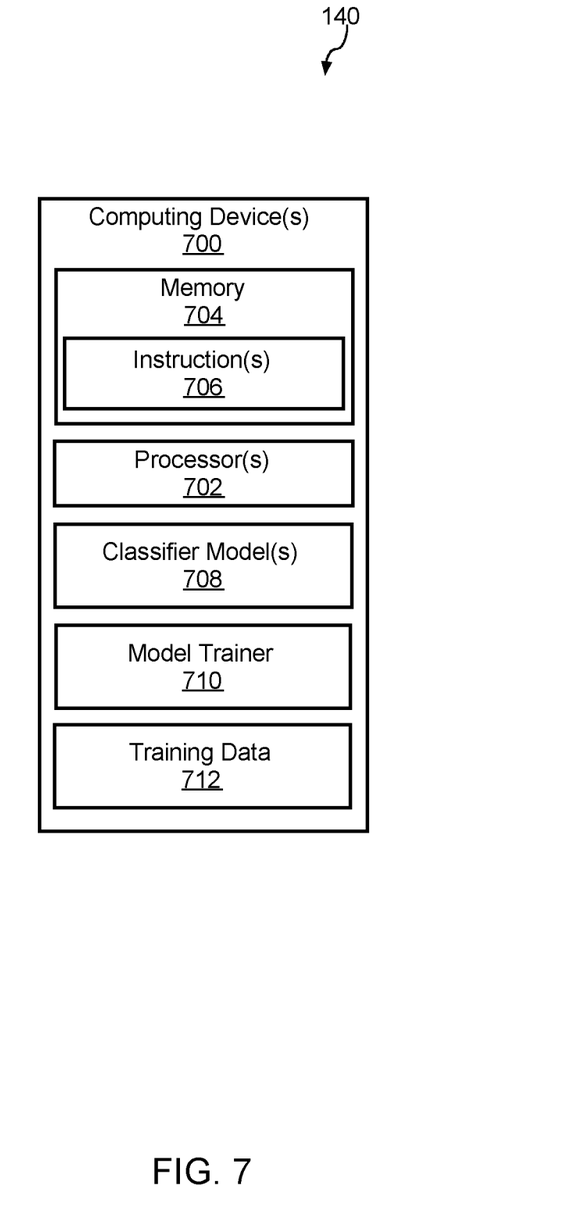
FIG. 7 depicts a block diagram of components of a computing system according to example embodiments of the present disclosure.

FIG. 7 illustrates suitable components of the computing system 140 according to example embodiments of the present disclosure. As shown, the computing system 140 can include one or more computing devices 700. The one or more computing devices 700 can include one or more processors 702 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. As shown, the computing system 140 can include a memory device 704. Examples of the memory device 704 can include computer-readable media including, but not limited to, non-transitory computer-readable media, such as RAM, ROM, hard drives, flash drives, or other suitable memory devices. The memory device 704 can store information accessible by the one or more processors 702 including computer-readable instructions 706 that can be executed by the one or more processors 702. The computer-readable instructions 706 can be any set of instructions that, when executed by the one or more processors 702, cause the one or more processors 702 to perform operations associated with authenticating the identity of the person wearing the earpiece. The computer-readable instructions 706 can be software written in any suitable programming language or can be implemented in hardware. In some implementations, the computing system 140 can include one or more classifier models 708. For example, the one or more classifier models 708 can include various machine-learned models, such as a random forest classifier; a logistic regression classifier; a support vector machine; one or more decision trees; a neural network; and or other types of machine-learned models, including both linear models and non-linear models. Example neural networks can include feed-forward neural networks, recurrent neural networks (e.g., long short-term memory recurrent neural networks), or other forms of neural networks.

In some implementations, the computing system 140 can train the one or more classifier models 708 through use of a model trainer 710. The model trainer 710 can train the one or more classifier models 708 using one or more training or learning algorithms. One example training technique is backwards propagation of errors ("backpropagation"). For example, backpropagation can include Levenberg-Marquardt backpropagation. In some implementations, the model trainer 710 can perform supervised training techniques using a set of labeled training data. In other implementations, the model trainer 710 can perform unsupervised training techniques using a set of unlabeled training data. The model trainer 710 can perform a number of generalization techniques to improve the generalization capability of the models being trained. Generalization techniques include weight decays, dropouts, or other techniques.

Figure 8:
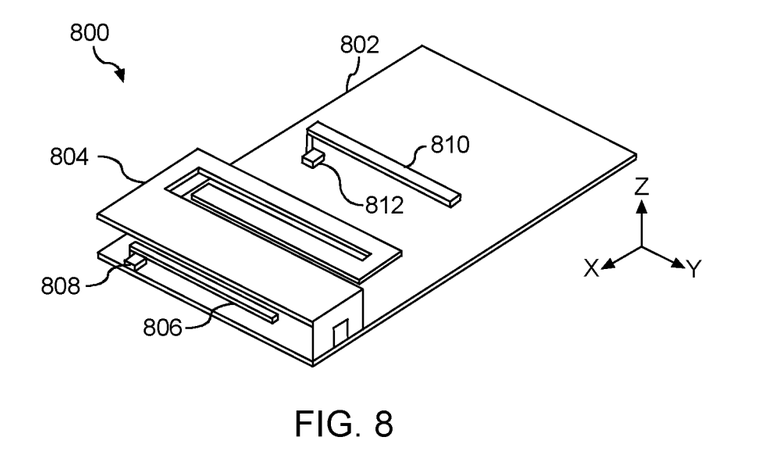
FIG. 8 depicts a modal antenna according to example embodiments of the present disclosure.

In particular, the model trainer 710 can train the one or more classifier models 708 based on a set of training data 712. The training data 712 can includes a number of training examples. Each training example can include example images of the ear (e.g., inner portion, outer portion) of different persons. In this manner, the one or more classifier models 708 can learn to classify the different images of the ear. FIG. 8 illustrates an example embodiment of a modal antenna 800 according to the present disclosure. The modal antenna 800 can, for instance, be used in the earpiece 110 (FIG. 2). For instance, the antenna 212 (FIG. 2) of the earpiece 110 can include the modal antenna 800. The modal antenna can be configurable in a plurality of antenna modes. Each of the antenna modes can have a distinct radiation pattern, polarization, or both. The modal antenna 800 can be configured in different antenna modes based, at least in part, on a link quality (e.g., channel quality indicator) between the earpiece and another device (e.g., other earpiece, access point, base station) to steer the radiation pattern of the modal antenna 800 towards the device. In this manner, the antenna mode of the modal antenna 800 can be adjusted as needed to maintain the communication link between the earpiece and another device as the user navigates an area.

As shown, the driven element 804 of the modal antenna 800 can be disposed on an circuit board 802. An antenna volume may be defined between the circuit board 802 (e.g., and the ground plane) and the driven element 804. The modal antenna 800 can include a first parasitic element 806 positioned at least partially within the antenna volume. The modal antenna 800 can further include a first tuning element 808 coupled with the first parasitic element 806. The first tuning element 808 can be a passive or active component or series of components and can be configured to alter a reactance on the first parasitic element 806 either by way of a variable reactance or shorting to ground. It should be appreciated that altering the reactance of the first parasitic element 806 can result in a frequency shift of the modal antenna 800. It should also be appreciated that the first tuning element 808 can include at least one of a tunable capacitor, MEMS device, tunable inductor, switch, a tunable phase shifter, a field-effect transistor, or a diode.

In some implementations, the modal antenna 800 can include a second parasitic element 810 disposed adjacent the driven element 804 and outside of the antenna volume. The modal antenna 800 can further include a second tuning element 812. In some implementations, the second tuning element 812 can be a passive or active component or series of components and may be configured to alter a reactance on the second parasitic element 810 by way of a variable reactance or shorting to ground. It should be appreciated that altering the reactance of the second parasitic element 810 can result in a frequency shift of the modal antenna 800. It should also be appreciated that the second tuning element 812 can include at least one of a tunable capacitor, MEMS device, tunable inductor, switch, a tunable phase shifter, a field-effect transistor, or a diode.

In some implementations, operation of at least one of the first tuning element 808 and the second tuning element 812 can be controlled to adjust (e.g., shift) the antenna radiation pattern of the driven element 804. For example, a reactance of at least one of the first tuning element 808 and the second tuning element 812 can be controlled to adjust the antenna radiation pattern of the driven element 804.

Figure 9:
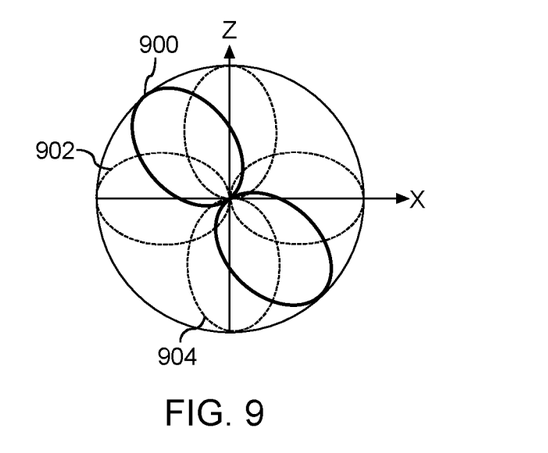
FIG. 9 depicts a two-dimensional radiation pattern associated with a modal antenna according to example embodiments of the present disclosure.

Adjusting the antenna radiation pattern can be referred to as "beam steering". However, in instances where the antenna radiation pattern includes a null, a similar operation, commonly referred to as "null steering", can be performed to shift the null to an alternative position about the driven element 804 (e.g., to reduce interference). FIG. 9 depicts antenna radiation patterns associated with the modal antenna 800 of FIG. 8 according to example embodiments of the present disclosure. It should be appreciated that operation of at least one of the first parasitic element 806 and the second parasitic element 810 can be controlled to configure the modal antenna 800 in a plurality of modes. It should also be appreciated that the modal antenna 800 can have a distinct antenna radiation pattern or antenna polarization when configured in each of the plurality of modes.

In some implementations, the modal antenna 800 can have a first antenna radiation pattern 900 when the modal antenna 800 is configured in a first mode of the plurality of modes. In addition, the modal antenna 800 can have a second antenna radiation pattern 902 when the modal antenna 800 is configured in a second mode of the plurality of modes. Furthermore, the modal antenna 800 can have a third antenna radiation pattern 904 when the modal antenna 800 is configured in a third mode of the plurality of modes. As shown, the first antenna radiation pattern 900, the second antenna radiation pattern 902, and the third antenna radiation pattern 904 can be distinct from one another. In this manner, the modal antenna 800 can have a distinct radiation pattern when configured in each of the first mode, second mode, and third mode.

Figure 10:
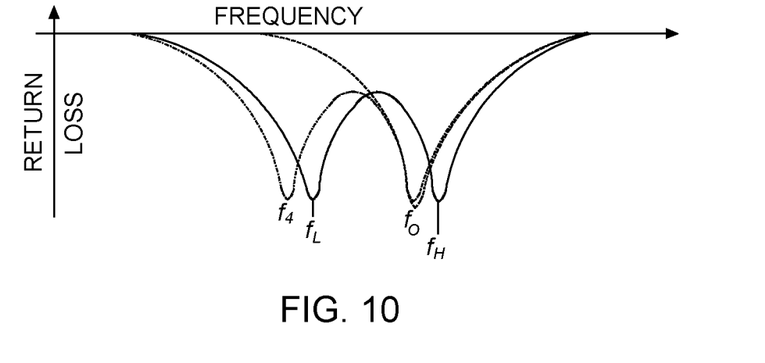
FIG. 10 depicts a frequency plot of a modal antenna according to example embodiments of the present disclosure.

FIG. 10 depicts an example frequency plot of the modal antenna 800 of FIG. 8 according to some aspects of the present disclosure. It should be understood that an electrical characteristic (e.g., reactance) of at least one of the first parasitic element 806 and the second parasitic element 810 can be controlled. In this manner, the electrical characteristic of at least one of the first parasitic element 806 and the second parasitic element 810 can be adjusted to shift a frequency at which the modal antenna 800 is operating.

In some implementations, the modal antenna 800 can be tuned to a first frequency $f_0$ when the first parasitic element 806 and the second parasitic element 810 are deactivated (e.g., switched off). Alternatively, or additionally, the modal antenna 800 can be tuned to frequencies $f_L$ and $f_H$ when the second parasitic element 810 is shorted to ground. Furthermore, the modal antenna 800 can be tuned to frequency $f_4$ when both the first parasitic element 806 and the second parasitic element 810 are shorted to ground. Still further, the modal antenna 800 can be tuned to frequencies $f_4$ and $f_0$ when the first parasitic element 806 and the second parasitic element 810 are each shorted to ground. It should be understood that other configurations are within the scope of this disclosure. For example, more or fewer parasitic elements may be employed. The positioning of the parasitic elements may be altered to achieve additional modes that may exhibit different frequencies and/or combinations of frequencies.

FIGS. 8-10 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A person authentication system comprising:
   one or more image capture devices; and
   a computing system comprising one or more computing devices, the computing system configured to perform operations comprising:
      obtaining data indicative of a unique identifier associated with an earpiece worn by a person, the unique identifier obtained from a beacon signal from a modal antenna of the earpiece, the modal antenna of the earpiece comprises a driven element, one or more parasitic elements, and one or more tuning elements coupled to the one or more parasitic element, the modal antenna of the earpiece configurable in one of a plurality of modes based, at least in part, on a channel quality indicator, each of the plurality of modes having a distinct radiation pattern;

obtaining image data of an ear of the person via the one or more image capture devices; and authenticating, by the computing system, an identity of the person based, at least in part, on the image data, and the data indicative of the unique identifier.

2. The person authentication system of claim 1, wherein the image data comprises one or more images of an outer ear and an inner ear, the inner ear being closer to an entrance of a canal of the ear than the outer ear.

3. The person authentication system of claim 2, wherein the operation of authenticating the identity of the person comprises authenticating the identity of the person based, at least in part, on one or more anatomical features of the outer ear and one or more anatomical features of the inner ear.

4. The person authentication system of claim 1, wherein the operation of authenticating the identity of the person comprises:

determining one of a plurality of persons as a person associated with the earpiece based, at least in part, on the data indicative of the unique identifier; and determining whether the person is the person associated with the earpiece based, at least in part, on the image data.

5. The person authentication system of claim 4, wherein determining whether the person is the person associated with the earpiece comprises:

comparing image data of the ear of the person to image data of an ear of the person associated with the earpiece; and authenticating the identity of the person when the image data of the ear of the person corresponds to the image data of the ear of the person associated with the earpiece.

6. The person authentication system of claim 1, wherein the one or more image capture devices are positioned at an entrance to a restricted area.

7. The person authentication system of claim 6, wherein obtaining data indicative of the unique identifier associated with the earpiece comprises obtaining one or more signals from the earpiece when the person is within a predetermined proximity of the entrance of the area.

8. A method of authenticating a person, the method comprising:

obtaining, by a computing system comprising one or more computing devices, data indicative of a unique identifier associated with an earpiece worn by a person, the unique identifier obtained from a beacon signal from a modal antenna of the earpiece, the modal antenna of the earpiece comprises a driven element one or more parasitic elements, and one or more tuning elements coupled to the one or more parasitic elements, the modal antenna of the earpiece configurable in one of a plurality of modes based, at least in part, on a channel quality indicator, each of the plurality of modes having a distinct radiation pattern;

obtaining, by the computing system, image data of an ear of the person; and authenticating, by the computing system, an identity of the person based, at least in part, on the image data, and the data indicative of the unique identifier.

9. The method of claim 8, wherein obtaining image data of the ear of the person comprises obtaining, by the computing system, one or more images of an outer ear.

10. The method of claim 8, wherein obtaining image data of the ear of the person comprises obtaining, by the computing system, one or more images of an inner ear, the inner ear being closer to an entrance of a canal of the car than an outer ear.

11. The method of claim 8, wherein obtaining image data of the ear of the person comprises obtaining, by the computing system, one or more images of an outer ear and an inner car, the inner ear being closer to an entrance of a canal of the ear than the outer ear.

12. The method of claim 11, wherein authenticating the identity of the person comprises authenticating, by the computing system, the identity based, at least in part, on one or more anatomical features of the outer ear and one or more anatomical features of the inner ear.

13. The method of claim 8, wherein obtaining data indicative of a unique identifier associated with an earpiece worn by a person comprises obtaining, by the computing system, one or more signals from a near-field communication circuit located in the earpiece.

14. The method of claim 8, wherein authenticating the identity of the person comprises:

determining, by the computing system, one of a plurality of persons as a person associated with the earpiece based, at least in part, on the data indicative of the unique identifier; and determining, by the computing system, whether the person is the person associated with the earpiece based, at least in part, on the image data.

15. The method of claim 14, wherein determining whether the person is the person associated with the earpiece comprises:

classifying, by the computing system, the image data of the ear to determine an image classification; and authenticating, by the computing system, the identity of the person based on the image classification.

16. The method of claim 8, wherein the unique identifier comprises a medium access control (MAC) address.

17. The method of claim 8, wherein obtaining image data of an ear of the person occurs when the person is at an entrance to an area.

18. The method of claim 17, further comprising:

responsive to authenticating the identity of the person, determining, by the computing system, whether the person is permitted to access an area based, at least in part, on the identity of the person.

19. The method of claim 18, further comprising:

providing, by the computing system, a notification indicative of whether the person is permitted to access the area.

* * * * *